(12) United States Patent
Brown et al.

(10) Patent No.: US 6,307,692 B1
(45) Date of Patent: Oct. 23, 2001

(54) DOUBLE PULSE WRITE DRIVER

(75) Inventors: Andrew David Brown, Bristol (GB); Richard David Barndt, Fremont, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/313,453

(22) Filed: May 18, 1999

(30) Foreign Application Priority Data

May 19, 1998 (EP) .................................. 98 303 940

(51) Int. Cl.[7] .................. G11B 5/09; G11B 5/02
(52) U.S. Cl. .................. 360/45; 360/46; 360/68
(58) Field of Search .................. 360/68, 46, 45, 360/51

(56) References Cited

U.S. PATENT DOCUMENTS

| | | | |
|---|---|---|---|
| 5,159,501 | * 10/1992 | Genheimer | 360/45 |
| 5,260,703 | * 11/1993 | Nguyen et al. | 360/46 |
| 5,331,479 | * 7/1994 | Madsen | 360/68 |
| 5,333,081 | 7/1994 | Mitsui | 360/46 |
| 5,339,202 | 8/1994 | Heinz et al. | 360/46 |
| 5,392,172 | 2/1995 | Yoshinaga et al. | 360/67 |
| 5,550,502 | 8/1996 | Aranovsky | 327/423 |
| 6,157,506 | * 12/2000 | Ueno | 360/45 |

FOREIGN PATENT DOCUMENTS 09259404   3/1997   (JP) .

OTHER PUBLICATIONS

European Search Report, EP 98 30 3940, Nov. 2, 1998.

* cited by examiner

Primary Examiner—Regina Y. Neal

(57) ABSTRACT

A device is described for increasing the rate at which data may be written to a magnetic data storage medium. The device includes circuitry for amplifying the data and circuitry for writing the data to a data storage medium. The circuitry for amplifying the data includes: circuits for amplifying the data; delaying and amplifying the data; and adding the amplified data and the delayed and amplified data.

31 Claims, 4 Drawing Sheets

DOUBLE PULSE WRITE DRIVER

FIELD OF THE INVENTION

The present invention relates to an apparatus for writing data using a magnetic tape data storage device, and particularly although not exclusively to an apparatus for improving the rate at which data may be written to tape.

BACKGROUND OF THE INVENTION

In a conventional magnetic data storage system it is known to store digital data from a host device, eg a computer. Digital data may be stored on a magnetic medium by switching the polarity of current through a magnetic write head which is in close proximity to the magnetic media. Conventionally, the magnetic media may comprise a flexible elongate tape which is coated with a magnetic material and which is wound between two reels past a magnetic write head. Alternatively, the magnetic media may also comprise a rigid disk which is coated with a magnetic medium. Data is recorded to the disk by moving a recording head in a radial direction across the disk while the disk is rotated about its centre.

In tape-based magnetic data recording systems, data may be recorded using a plurality of write heads and read with a plurality of read heads. Conventionally, these write and read heads may be either substantially stationary with respect to the rest of the device in which case data are stored in a plurality of tracks parallel to the elongate direction of the tape or the write and read heads may be mounted on a drum which is rotated about an axis at an angle to the elongate direction of the tape, in which case data is stored in a series of tracks diagonally across the magnetic tape.

Conventionally, recording heads are fabricated from ferrite which comprises a sintered combination of a ferromagnetic material and a ceramic combined to yield a material with the high magnetic permeability of the former and the high electrical resistance of the latter. However, writing data to magnetic media using ferrite heads becomes more inefficient at high data bit-rates. At high frequencies the losses due to irreversible heating of the write head results in a roll-off of the magnetic field of the write head for a given input current. Referring to FIG. 1 herein, there is illustrated by a solid line 10 a plot indicating how the write head frequency response decreases as the frequency of the writing current increases when using a ferrite write head. The output for a given current has dropped significantly at the "roll off" frequency 120 which is, typically of the order 30–40 MHz and which limits a maximum write rate of the head to the order 80 MBits/s. When writing data to a magnetic storage medium the data pulses as written to the magnetic storage medium are convolved with the frequency response of the write head. This process of convolution has the effect of "smearing out" individual pulses on the storage medium. The smeared out pulses on the storage medium may overlap with the adjacent smeared out pulses as the pulse separation decreases. Eventually, the degree of overlap between adjacent pulses can become such that pulses cannot be distinguished during a read operation. Hence, the frequency response of the write head in a magnetic data storage device can act as a constraint on the highest frequencies and hence the highest data bit rates recorded to the magnetic data storage medium.

It is known to attempt to correct for this roll off in the frequency response of the write head by preferentially boosting high frequencies in the write current according to a response curve such as illustrated by dashed line 130 in FIG. 1. Preferentially boosting high frequencies prior to input to a write head in the write current to compensate for the decrease in efficiency of the write head should yield an approximately flat frequency response as illustrated by the dot dashed line 140 in FIG. 1. This technique of boosting the high frequencies is conventionally known as "Write Pre-Equalization" (WPE). However, write drivers in digital magnetic data storage systems are highly non-linear devices. Conventional write drivers comprise switches which send two polarities of current to the write heads in order to record two distinct magnetization states on the magnetic media. Hence, any prior art attempts to boost high frequencies in such devices have been complex. In particular, Ampex produced a write pre-equalization scheme which comprised a current driver based on a linear amplifier, i.e. the output of the write driver was proportional to the input to the write driver. The Ampex scheme applied a boost to the high frequency response of the write driver to compensate for the roll-off in the frequency response of the write head. However, the Ampex implementation of write pre-equalization required substantial power, typically of the order 15 W, and could only be produced using discrete components and hence it was not possible to implement this as a single application specific integrated circuit (ASIC). In addition, the Ampex scheme was also difficult to set up.

In addition the roll-off in the frequency response of a recording head at high frequencies as described hereinbefore there is another, more significant, effect resulting from a finite rise time of a magnetic field generated by a record head in response to a substantially step-like change in a recording current driving said record head. In response to a, for example, positive going head of a driver current the resulting magnetic field starts to increase. However, in the event of a negative going edge in the recording head driver current happening before the magnetic field in a recording head has reached a maximum steady state value then the magnetic field starts to decease and at a certain physical location on a magnetic data storage medium the magnetization of the medium changes direction. However, in the case where increase in magnetic field, in response to a positive going edge of a driver current has sufficient time to rise to a level closer to the final steady state value then the time required for the magnetic field to fall to zero in response to a negative going edge of a head driver current is longer than in the previous case described hereinabove. Hence, positions of magnetic field transitions on a magnetic data storage medium may be laterally displaced with respect to one another dependent upon a time duration between a last positive going edge of the head driver current and a last going edge of a edge driver current. This lateral displacement of magnetization direction on the magnetic recording medium is also known herein as "bit shift", "peak shift" and "transition shift" is non-linear and is affected by the duration of at least the last driver current pulse.

The effect of these non-linear lateral displacements of regions of magnetization on magnetic recording media can result in timing errors during a subsequent read operation of data stored on the storage medium resulting in an increase in the number of errors occurring during the read operation.

The ongoing pressure in the development of new magnetic data storage systems is to increase the data storage capacity of any magnetic data storage media. By increasing the effective bandwidth of the write head in a magnetic data storage system it is possible to increase the bit rate at which data are written to, for example, magnetic tapes and hence increasing the storage capacity of the tape. There is a need for a means to increase the effective bandwidth of ferrite recording heads in a way which can be implemented as an ASIC and which is straightforward to both calibrate and use.

SUMMARY OF THE INVENTION

The specific embodiment and methods according to the present invention aim to increase the effective bandwidth of recording heads in magnetic data storage systems, and thereby increase the rate of which data can be written to magnetic data storage media in such systems.

Specific methods according to the present invention recognize that increasing the high frequency content of a write current sent to a magnetic recording heads will partially compensate for the decrease in efficiency of such write heads at high frequencies and hence increase the effective bandwidth of the write head.

According to a first aspect of the present invention there is provided a data storage device for storing data signals, said device having a write channel characterized by comprising:

a write head for writing said data signals, and compensation means for compensating for a frequency response roll-off of said write head, said compensation means comprising:

delay means for delaying said data signals; and means for setting a relative amplitude of said data signals and said delayed data signals, wherein said delay means, and said amplitude control means operate to produce a data write signal which is input to said write head, said data write signal having a frequency characteristic which compensates at least partially for a frequency response roll-off of said write head.

Preferably, said means for delaying said data signals has an adjustable delay time.

Preferably, said means for setting a relative amplitude of said data signals and said delayed data signals comprises:

a first amplifier means arranged to amplify said data signals; and a second amplifier means arranged to amplify said delayed data signals.

A said amplifier means may comprise an H-bridge electronic circuit.

Preferably, said means for amplifying said data signals and said means for amplifying said delayed data signals are configured such that a degree of amplification of said data signals relative to a degree of amplification of said delayed data signals is adjustable by means of at least one control signal.

Preferably, said first amplifier means and said second amplifier means are each independently controllable by a separate corresponding respective control signal.

Said delay means may be capable of applying a variable delay period to said data signals.

A degree of amplification of said data signals and a degree of amplification of said delayed data signals may be adjustable such that an amplitude of the amplified said data signals is larger than an amplitude of the amplified said delayed data signals.

Said write head suitably comprises a magnetic recording head.

Preferably, said compensation means comprises an application specific integrated circuit.

According to a second aspect of the present invention, there is provided a method of writing data to a data storage medium via a write head, said method comprising the steps of:

receiving data signals from a host data source;

writing said data signals to a first buffer;

writing said data signals to a delay device;

reading delayed said data signals from said delay device;

writing said delayed data signals to a second buffer;

inverting said delayed data signals;

adding said first buffered data to said delayed, buffered and inverted data signals to obtain a modified data write signal; and performing a write operation to write said modified data signal to said data storage medium via said write head.

Said data storage medium may comprise an elongate tape, and said write operation may comprise writing said modified data write signals along a length of said tape.

According to a third aspect of the present invention there is provided a method of driving a write head in a data storage device, said method comprising the steps of:

receiving an incoming stream of data signals from a host data source;

delaying said data signals by a predetermined delay period;

combining said data signals and said delayed data signals to produce a modified data write signal; and driving a write head using said modified data write signal, wherein said modified data write signal contains frequency components arranged to compensate at least partially for a frequency response roll off of said write head.

Said data signal from said host data source may be amplified to a first peak amplitude; and said delayed data signal may be amplified to a second peak amplitude.

Preferably, said delayed data signal is inverted with respect to said data signal; and said modified data write signal comprises a summation of said data signal and said inverted delayed data signal.

Preferably, said modified data write signal comprises a plurality of bits of information, each bit represented by a corresponding bit pulse comprising:

a first pulse having a first period and a first amplitude; and a second pulse having a second period and a second amplitude, wherein said first amplitude is greater than said second amplitude and said first period is shorter than said second period.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Specific methods according to the present invention described herein may be particularly suited to magnetic tape recording devices having a rotating read/write head in which an elongate tape is drawn past the head and the read/write heads rotate about an axis aligned at an angle to the direction of the tape motion.

In particular, the best mode herein relates to a Digital Data Storage system (DDS) based on the known digital audio tape system (DAT) being a helical scan system. The tape data storage system presented herein may advantageously implement one particular version of the DDS system namely the DDS4 standard which is still under development. However, it will be understood by those skilled the art that the methods and apparatus disclosed herein are not restricted to systems having rotating heads or to systems where digital data are stored on tape. The generality of the present invention described herein is limited in scope only by the essential features according to the claims herein.

Figure 1:
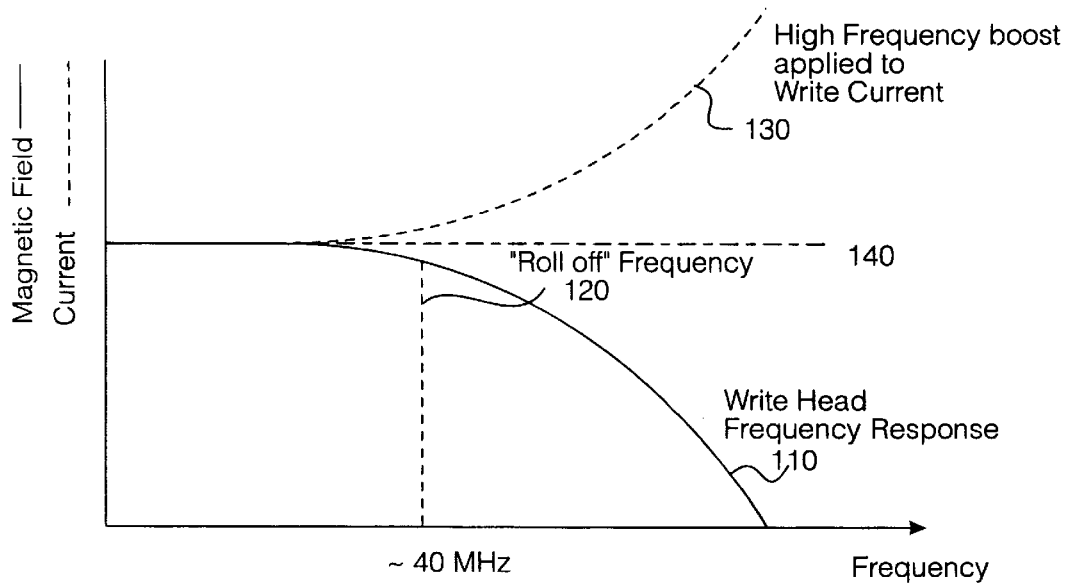
FIG. 1 shows a plot illustrating how the write head frequency response decreases as the frequency of the writing current increases.
Figure 2:
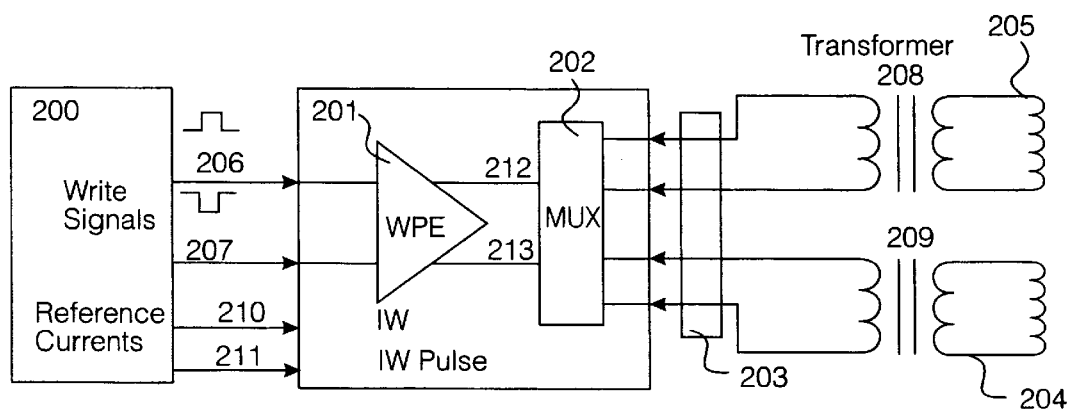
FIG. 2 illustrates schematically a block diagram of part of a write channel of a data storage device described herein.
Figure 4:
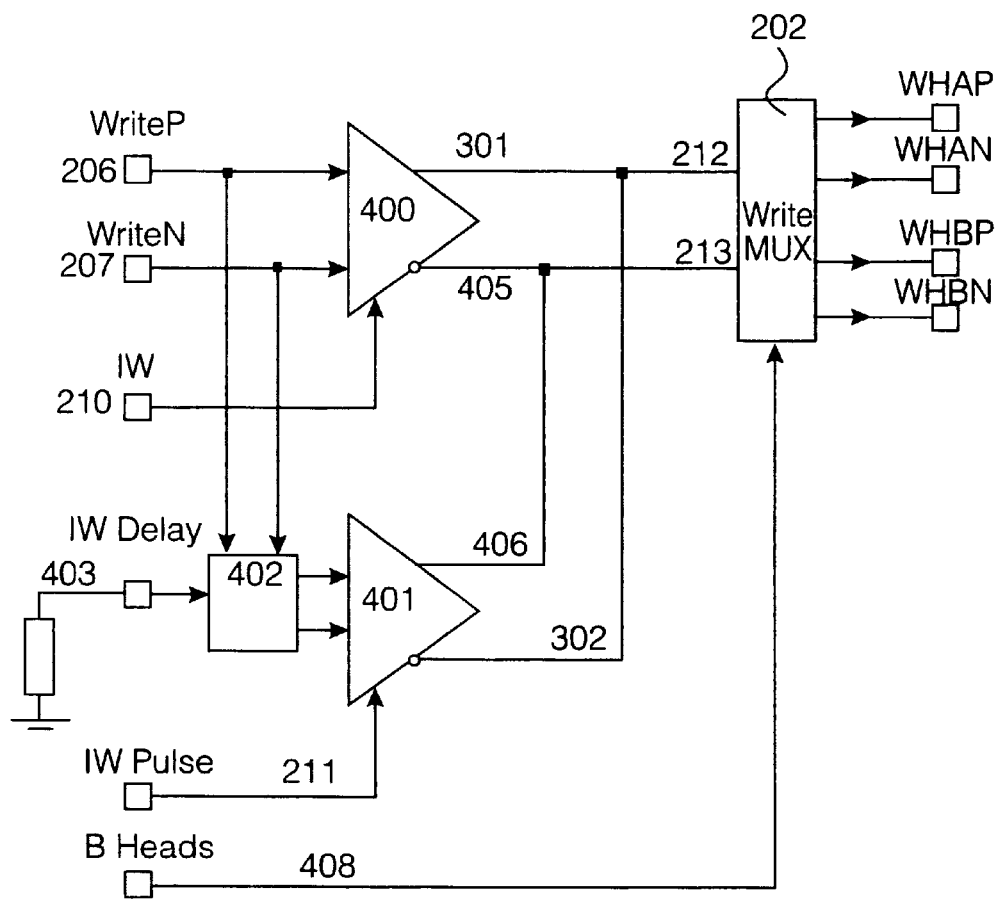
FIG. 4 illustrates schematically means for implementation of a summation of a main driver current with an inverted delayed version of the driver current according to a specific embodiment of the present invention.
Figure 3:
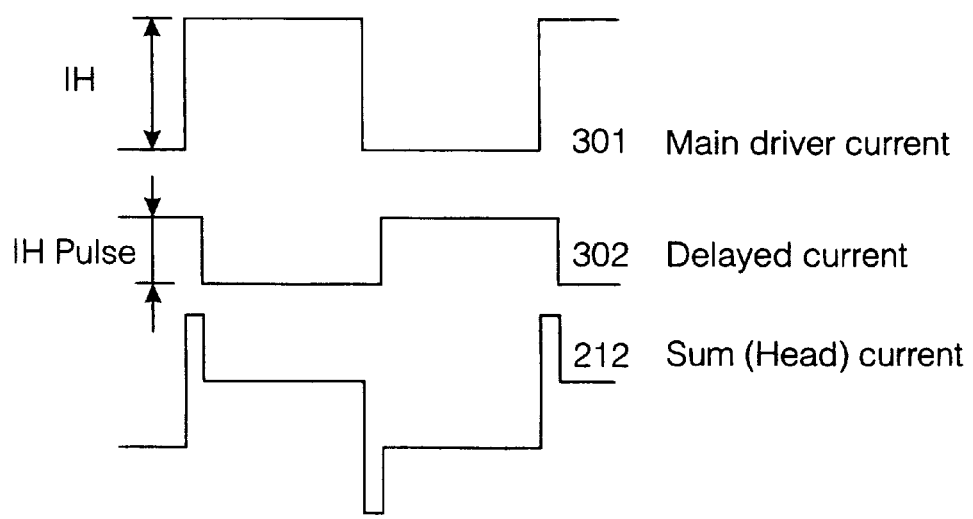
FIG. 3 illustrates schematically how a main driver current and a delayed inverted driver current are summed to produce a double pulse driver current according to a specific implementation of the present invention.

Referring to FIGS. 2 to 4 herein, there is illustrated schematically a write channel of a data storage device which records digital data onto a magnetic tape media using two write heads mounted on a rotating drum. Whilst a pair of write heads are presented in the best mode contemplated by the inventors, in general the methods presented herein apply to one or a plurality of write heads. The write head has a frequency response similar to that shown as line 110 in FIG. 1 herein, in which there is a degraded frequency response of the write head at higher frequencies. A channel ASIC 200 provides a source of logic signals which are to be recorded on to a tape according to the best mode presented herein. The channel ASIC 200 converts a stream of digital data from the host device into streams of digital data write signals 206 and 207 with appropriate voltage levels, to input into a write driver 201. Data stream 207 is an inverted version of data stream 206. The write driver 201 operates to modify bits of data comprising the data stream, boosting a higher frequency content of the data stream to fully or partially compensate for the higher frequency roll-off of the write heads.

The process of inverting a digital signal comprises replacing every instance of the digital signal which represents binary digit "0" with a digital signal that represents binary digit "1" and replacing every instance of the digital signal which represents a binary digit "1" with a digital signal representing binary digit "0". The voltage levels output by channel ASIC 200 conform to the voltage levels conventionally used in known pseudo emitter coupled logic (PECL). The two logic states are typically represented by a differential voltage swing of 1V peak-to-peak. PECL has, typically, the same differential voltage swings as conventional emitter coupled logic (ECL) but have been translated by +5V. PECL is a well known way of transferring logic signals where the timing of such signals is critical.

The voltage write signals 206 and 207 are input to the double pulse write driver 201. The write driver 201 outputs conventional write current signals set by external reference currents 210 and 211. Each bit pulse of write currents 212 and 213 output from write driver 201 have an extra narrow pulse of current added on each transition according to one aspect of the present invention. The width of this narrow current pulse is set by an external reference current and an external resistor or capacitor. The write current 212 and 213 are input to a multiplexor 202 which switches the write current between the two write heads 204 and 205 via a parasitic coupling 203 and transformers 208 and 209. The parasitic coupling 203 comprises a parasitic connection between the physical location of the double pulse write driver as described herein and either the transformers 208 and 209 or the write heads 204 and 205.

Referring to FIGS. 3 and 4 herein, there is illustrated schematically write signals combined to produce a resultant modified write signal 212 configured, to compensate for high frequency roll off of a write head. Main driver current 301 is produced by a first transconductor circuit 400 which produces two write output signals in response to two input signals. The output signals of the first transconductor 400 are amplified versions of the write signals 206 and 207 input into first transconductor 400. The input signals are also input to a delay unit 402, the outputs of the delay unit being input to a second transconductor 401. Write signals 206, 207 input to first and second transconductors respectively each comprise a digital logic voltage signal. Outputs of the first and second transconductors comprise current signals. Each transconductor comprises a buffer, a switch, and a current amplifier source, the combination of buffer, switch and current amplifier source operating to receive a said voltage logic signal and output said a current pulse drive signal of predetermined and controlled current value. To the main driver current 301 is added an inverted and delayed driver current 302. The amplitude of the pulses in the driver current and delayed current are represented in FIG. 3 herein as IH and IH-pulse, respectively. The amplitudes of main driver current 301 and delayed inverted current 302 IH and IH-Pulse are respectively set by the reference currents 210 and 211 and may be preset. The main driver current 301 and delayed inverted current 302 are added to produce a modified write signal 212, denoted as sum (head) current in FIG. 3. The effect of adding the delayed inverted current 302 to main driver 301, if IH-pulse is less than IH, is to produce a respective double pulse current spike corresponding to each transition of the main driver current. The double pulse comprises a narrow pulse spike which has a positive leading edge which is coincident with the positive leading edge of the main driver current followed by a pulse having a lower amplitude than the pulse of the main driver current, but being of longer duration. At each negative going leading edge of the main driver current there is a coincident negative going narrow pulse in the sum current. The positive going and negative going narrow pulse spikes are of the same duration as each other. Taking the Fourier transform of the narrow pulse spikes and broad main pulse components of the sum head current 212 it will be understood that the narrow pulse contributes significantly to the high frequency components of the resultant modified write signal, sum (head) current 212. The frequency spectral distribution of the modified write current input to the write head including additional high frequency components from the narrow pulse, approximate to the frequency spectrum of a conventional write current having uniform amplitude over a wide range of frequencies multiplied by the dashed curve 130 shown in FIG. 1. These additional high frequency components in the write current partially compensate for the higher frequency roll-off in the frequency response of the write head at approximately 40 MHz. According to the best mode presented herein, the additional high frequency components added to the write current results in an improved effective bandwidth of the write heads, and as a result may increase the roll off in the response of the write channel as a whole, including the write head, from approximately 40 MHz up to approximately 60 MHz.

Incorporation of a double pulse driver circuit in the write channel of a data storage device as described herein has the further advantage that it may be optimized such that a changing magnetic field generated by a record head in response to a positive going edge of a driver current rises to a same value irrespective of a time duration of a driver current pulse initiating the changing magnetic fields. Ensuring that the magnetic field rises to a fixed value irrespective of the duration of the driver current pulse initiating the rise in magnetic field reduces the occurrence of lateral displacement of changes in magnetization direction on the data storage medium. Minimizing relative lateral displacements between pulses recorded on a magnetic data storage medium minimizes the occurrence of timing errors during subsequent read operation and thereby minimizes the measured bit error rate.

Referring to FIG. 4 herein, there is illustrated schematically, in more detail the write driver 201 and multiplexer 202. According to the best mode presented herein, the write driver and multiplexer are implemented on a single application specific integrated circuit (ASIC). The two logical signals WriteP 206 and WriteN 207 from Channel ASIC 200, are written to first transconductor 400. In addition, signals writeP 206 and writeN 207 are written to delay unit 402. The delay circuit stores and delays write signals 206 and 207 for a relatively short period of time. The delay period is designed to be easily adjustable and calibrated by changing the value of a single resistor or capacitance external to the ASIC. In the best mode presented herein, where the write head roll-off frequency is typically of the order 30–40 MHz, the optimal time by which the write signals should be delayed is found to be of the order of 3.5 ns. The delayed signals are written to second transconductor 401. In the best mode presented herein, transconductors 400 and 401 have substantially similar properties. First and second transconductors 400 and 401 are both conventional. The electronic circuitry comprising first transconductor 400 is preferably a direct copy of the electronic circuitry comprising second transconductor 401. One advantage of the best mode described herein is that it is straight forward to implement in an integrated circuit using known techniques.

The delayed logical signals are read out from second transconductor 401 is and are combined with the output of first transconductor 400 prior to sending to write multiplexer 202. The output signals of second transconductor 401 and first transconductor 400 are combined in the following manner. The main driver current 301 is added to inverted delayed driver current 302 and inverted main driver current 405 is added to an inverted delayed version of itself, yielding the respective sum currents 202 and 213 which are used to drive the write heads.

The sum current 212 and its inverted counterpart 213 are written to the write multiplexer 202. The write multiplexer switches the sum currents 212 and 213 between two write heads according to switching signals 408. Write current 212 is switched between inputs WHAP and WHBP which correspond to the two write heads 204 and 205. Similarly, write signals 213 are switched between inputs WHAN and WHBN. Whilst a write channel serving two write heads is shown in the best mode herein, the invention applies equally to a write channel having a single write head, or any other plurality of write heads.

Figure 5:
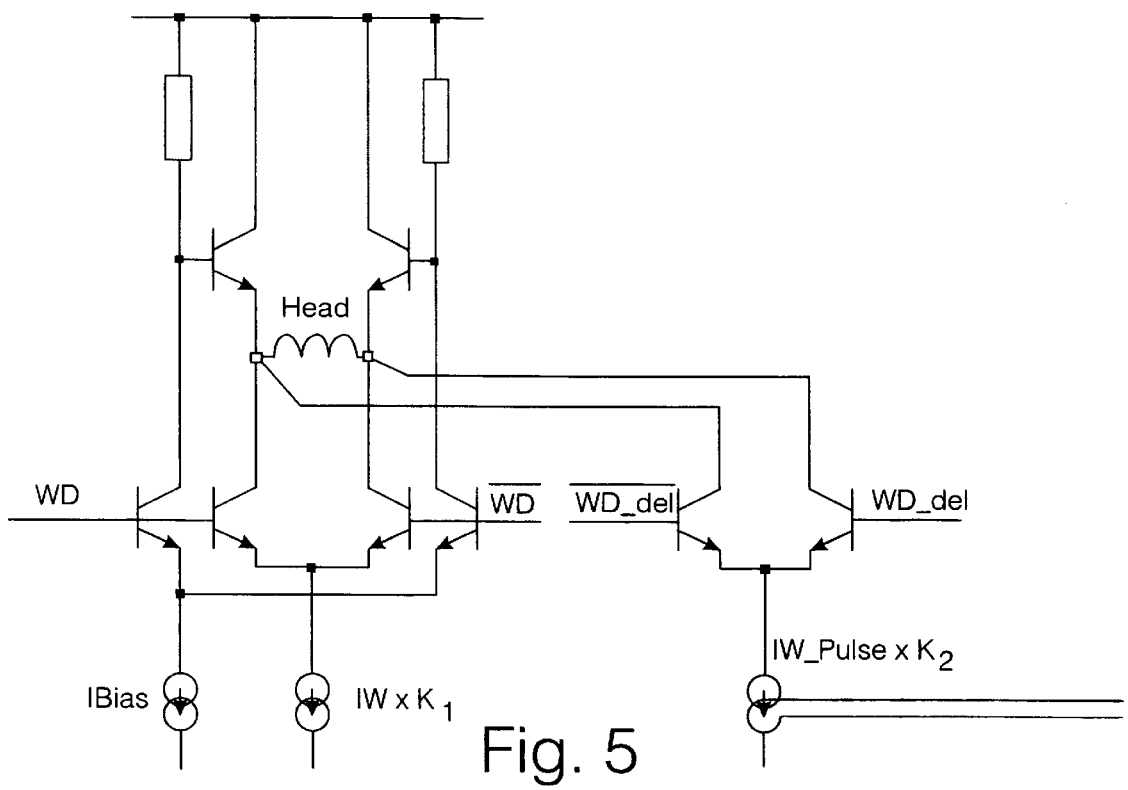
FIG. 5 illustrates schematically a circuit comprising a write driver according to a specific embodiment of the present invention.

Referring to FIG. 5. Herein, there is illustrated schematically an example of an H-Bridge write driver according to the best mode presented herein. The input signals WD and WD correspond with the logical signals 206 and 207 respectively. The outputs of the H-Bridge circuit comprise the main driver currents 301 and 405. In addition, there is included a portion of an H-bridge circuit. The additional H-Bridge circuit portion receives the delayed logical signals WD-DEL and WD-DEL which are the delayed versions of logical signals 206 and 207 respectively after having been read from the output of delay unit 402.

The amplitudes of the main driver currents 301 and 405 and the delayed driver currents 406 and 302 which are combined before sending to the write heads are set by reference current IW×K1 and IW-Pulse×K2. K1 and K2 are chosen to ensure that main driver currents 301 and 405 have larger amplitudes than the delayed currents 406 and 302.

Figure 6:
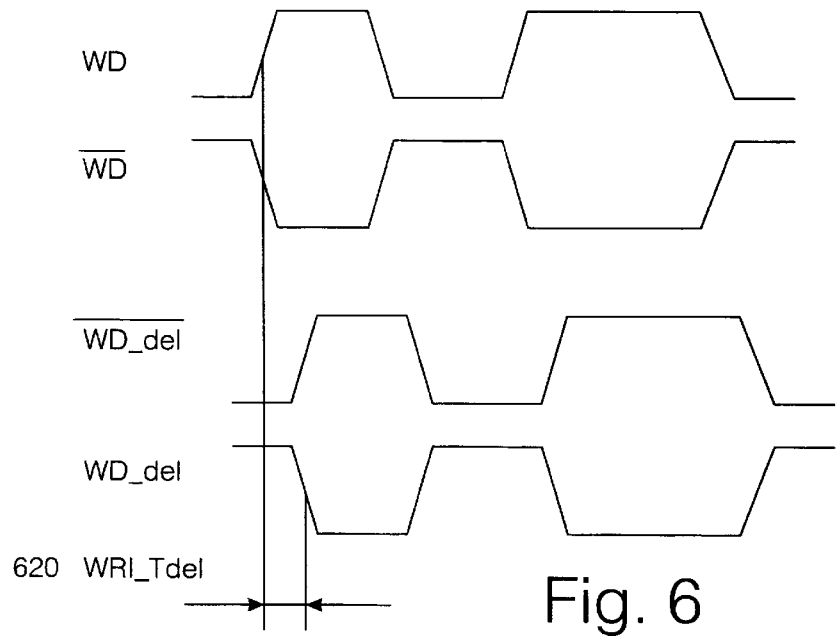
FIG. 6 illustrates schematically a set of logic signals WD, WD, WD-DEL and WD-DEL which are input to a set of buffers, and a time delay WRI-TdeI between the two sets of logic signals according to a specific implementation of the present invention.

Referring to FIG. 6 herein, there is illustrated schematically typical waveforms of logical signals WD, WD, WD-DEL_ and WD-DEL. The time delay introduced by delay unit 402 is indicated by WRI-Tdel 620. As indicated in FIG. 6 the logical signals have a finite rise time which is the time taken for the current to change from the value representing binary digit "0" to the current representing binary digit "1". The same finite transition time is observed for the transition from binary digit "1" to binary digit "0". One of the key requirements of the write driver is to minimize the rise time of the current. Typical values of the expected range in write current according to the best mode herein are 30 mA to 100 mA. Typically, a write head having inductance of the order 100 to 200 mH may be used.

Figure 7:
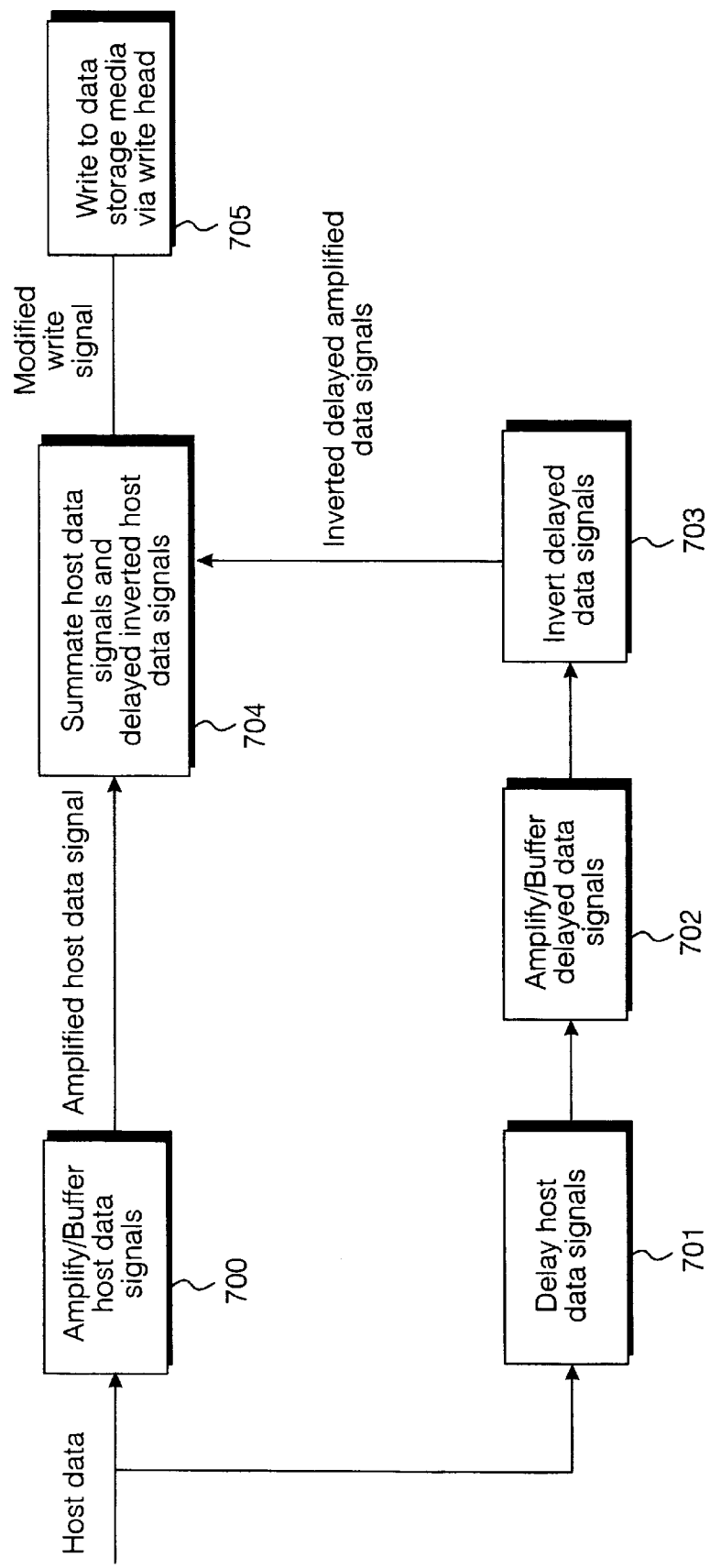
FIG. 7 illustrates schematically signal processing stages of a host data stream according to a specific method of the present invention.

Referring to FIG. 7 herein, there is illustrated schematically a signal processing diagram for processing of the host data signals into a form which includes frequency components which compensate for a higher frequency roll off of the ferrite write head. Incoming host data signals in the form of bit pulses are split into first and second signal paths, the first path being amplified/buffered in first transconductor 400 by a first degree of amplification 700. The second signal path of host data signals is delayed by delay device 402 for a predetermined delay period, which may be varied by adjustment. The delayed host data signals are amplified/buffered in second transconductor 401, which also inverts the delayed host data signals and amplifies the host data signals by a second degree of amplification, the second degree of amplification being less than the first degree of amplification. The inverted delayed data signals are summed 704 with the amplified host data signal to produce a modified write signal as illustrated by sum (head) current 212 in FIG. 3 herein. The modified write signal is of the form described hereinabove, containing a relatively short higher amplitude spike on a leading edge of each main pulse, which introduces higher frequency components which compensate for a higher frequency roll off of the write head. The modified data write signal is written to the tape data storage medium via the write head 705. Since the introduction of higher frequency components into the modified data write signal compensates for a frequency response roll off of the write head, the resultant data signals written to the tape data storage medium may be better defined and have a better signal to noise ratio and/or a lower bit error rate than in the prior art case.

What is claimed is:

1. A data storage device for storing data signals, said device having a write channel comprising:

a write head for writing said data signals, and compensation means for compensating for a frequency response roll-off of said write head, said compensation means comprising:

delay means for delaying said data signals; and means for setting a relative amplitude of said data signals and said delayed data signals; and means, coupled to said setting means, for adding said data signals and said delayed data signals to form a modified data write signal which is input to said write head, said modified data write signal having a frequency characteristic which compensates at least partially for a frequency response roll-off said write head.

2. A data storage device as claimed in claim 1, wherein said means for delaying said data signals has an adjustable delay time.

3. A data storage device as claimed in claim 1, wherein said means for setting a relative amplitude of said data signals and said delayed data signals comprises:

a first amplifier means arranged to amplify said data signals; and a second amplifier means arranged to amplify said delayed data signals.

4. A data storage device as claimed in claim 3, wherein a said amplifier means comprises an H-bridge electronic circuit.

5. A data storage device as claimed in claim 3, wherein said means for amplifying said data signals and said means for amplifying said delayed data signals are configured such that a degree of amplification of said data signals relative to a degree of amplification of said delayed data signals is adjustable by means of at least one control signal.

6. A data storage device as claimed in claim 3, wherein said first amplifier means and said second amplifier means are each independently controllable by a separate corresponding respective control signal.

7. A data storage device as claimed in claim 1, wherein said delay means is capable of applying a variable delay period to said data signals.

8. A data storage device as claimed in claim 1, wherein a degree of amplification of said data signals and a degree of amplification of said delayed data signals is adjustable such that an amplitude of amplified said data signals is larger than an amplitude of the amplified said delayed data signals.

9. A data storage device as claimed in claim 1, wherein said write head comprises a magnetic recording head.

10. A data storage device as claimed in claim 1, wherein said compensation means comprises an application specific integrated circuit.

11. A data storage device as claimed in claim 1, wherein said data signals are, prior to processing by said delay means, split into first and second signal paths, the first path of signals being amplified and buffered by a first degree of amplification and the second signal path of data signals being delayed by said delay means for a predetermined delay period.

12. A method of writing data to a data storage medium via a write head, said method comprising the steps of:

receiving data signals from a host data source;

writing said data signals to a first buffer;

writing said data signals to a delay device;

reading delayed said data signals from said delay device;

writing said delayed data signals to a second buffer;

inverting said delayed data signals;

adding said first buffered data signals to said delayed, buffered and inverted data signals to obtain a modified data write signal; and performing a write operation to write said modified data write signal to said data storage medium via said write head.

13. The method as claimed in claim 12, wherein said data storage medium comprises an elongate tape, and said write operation comprises writing said modified data write signals along a length of said tape.

14. The method as claimed in claim 13, wherein said data signal from said host data source is amplified to a first peak amplitude and said delayed data signal is amplified to a second peak amplitude.

15. The method as claimed in claim 12, wherein following receipt of said data signals from a said host data source, said data signals are split into first and second signal paths, the signals of the first path being written to said first buffer and amplified and the signals of said second path being delayed by said delayed device.

16. A method of driving a write head in a data storage device, said method comprising the steps of:

receiving an incoming stream of data signals from a host data source;

delaying said data signals by a predetermined delay period;

adding said data signals and said delayed data signals to produce a modified data write signal; and driving a write head using said modified data write signal, wherein said modified data write signal contains frequency components arranged to compensate at least partially for a frequency response roll off of said write head.

17. The method as claimed in claim 13, wherein:

said delayed data signal is inverted with respect to said data signal; and said modified data write signal comprises a summation of said data signal and said inverted delayed data signal.

18. The method as claimed in claim 16, wherein said modified data write signal comprises a plurality of bits of information, each bit represented by a corresponding bit pulse comprising:

a first pulse having a first period and a first amplitude; and a second pulse having a second period and a second amplitude, wherein said first amplitude is greater than said second amplitude and said first period is shorter than said second period.

19. A method for at least partially compensating for higher frequency roll-off in the frequency response of a write head, comprising the steps of:

providing a write signal;

generating therefrom a first write current signal having a first amplitude;

delaying and inverting the write signal for generating a second write current signal having a second amplitude that is less than the first amplitude;

summing the first write current signal and the second write current signal to produce a modified write current signal having current transients at rising and falling transitions thereof for increasing high frequency components of the modified write current signal for approximating a frequency spectrum of a write current having a uniform amplitude over a range of frequencies; and applying the modified write current signal to the write head.

20. A data storage device for storing data signals, said device having a write channel comprising:

a write head for writing said data signals, and write pre-equalization means for compensating for a frequency response roll-off of said write head, said write pre-equalization means comprising:

means for delaying said data signal;

means for setting a relative amplitude of said data signals and said delayed data signals; and means, coupled to said setting means, for adding said data signals and said delayed data signals to form a modified data write signal which is input to said write head, said modified data write signal further comprising a relatively short higher amplitude spike on a leading edge of a main pulse of said signal, said relatively short higher amplitude spike introducing higher frequency components which compensate for a higher frequency roll-off of said write head.

21. A data storage device as claimed in claim 20, wherein said modified data write signal comprises a double pulse current spike.

22. A data storage device as claimed in claim 21, wherein said double pulse current spike comprises a narrow pulse spike which has a positive leading edge coincident with the positive leading edge of the main driver current followed by a pulse having a lower amplitude and longer duration than the pulse of the main driver current.

23. A method of writing data to a data storage medium via a write head, said method comprising:

receiving data signals from a host data source; writing said data signals to a first buffer;

writing said data signals to a delay device;

reading delayed said data signals from said delay device;

writing said delayed data signals to a second buffer;

inverting said delayed data signals;

adding said first buffered data signals to said delayed, buffered and inverted data signals to obtain a modified write pre-equalization data write signal which comprises a relatively short higher amplitude spike on a leading edge of said modified signal and which introduces higher frequency components to compensate for a higher frequency roll-off of said write head; and performing a write operation to write said modified data write signal to said data storage medium via said write head.

24. A method of writing data as claimed in claim 23, wherein said modified data write signal comprises a double pulse current spike.

25. A method of writing data as claimed in claim 24, wherein said double pulse current spike comprises a narrow pulse spike which has a positive leading edge coincident with the positive leading edge of the main driver current followed by a pulse having a lower amplitude and longer duration than the pulse of the main driver current.

26. A method of driving a write head in a data storage device, said method comprising:

receiving an incoming stream of data signals from a host data source;

delaying said data signals by a predetermined delay period;

adding said data signals and said delayed data signals to produce a modified write pre-equalization data write signal, said modified signal comprising a relatively short higher amplitude spike on the leading edge of a main pulse of said signal which introduces higher frequency components to compensate for a higher frequency roll-off of said write head; and driving a write head using said modified data write signal, wherein said modified data write signal contains frequency components arranged to compensate at least partially for a frequency response roll-off of said write head.

27. A method of driving a write head as claimed in claim 26, wherein said modified data write signal comprises a double pulse current spike.

28. A method of driving a write head as claimed in claim 27, wherein said double pulse current spike comprises a narrow pulse spike which has a positive leading edge coincident with the positive leading edge of the main driver current followed by a pulse having a lower amplitude and longer duration than the pulse of the main driver current.

29. A write pre-equalization method for at least partially compensating for higher frequency roll-off in the frequency response of a write head, said method comprising:

providing a write signal;

generating therefrom a first write current signal having a first amplitude;

delaying and inverting the write signal for generating a second write current signal having a second amplitude that is less than the first amplitude;

summing the first write current signal and the second write current signal to produce a modified write current signal having current transients at rising and falling transitions thereof for increasing high frequency components of the modified write current signal for approximating a frequency spectrum of a write current having a uniform amplitude over a range of frequencies; and applying the modified write current signal to the write head.

30. A write pre-equalization method as claimed in claim 29, wherein said modified data write signal comprises a double pulse current spike.

31. A write pre-equalization method as claimed in claim 30, wherein said double pulse current spike comprises a narrow pulse spike which has a positive leading edge coincident with the positive leading edge of the main driver current followed by a pulse having a lower amplitude and longer duration than the pulse of the main driver current.

* * * * *

UNITED STATES PATENT AND TRADEMARK OFFICE
CERTIFICATE OF CORRECTION

PATENT NO. : 6,307,692 B1  Page 1 of 1
DATED : October 23, 2001
INVENTOR(S) : Brown et al.

It is certified that error appears in the above-identified patent and that said Letters Patent is hereby corrected as shown below:

<u>Column 50,</u>
Line 1, "The method as claimed in claim 13, wherein:" should read -- The method as claimed in claim 16, wherein: --

Signed and Sealed this

Fourteenth Day of May, 2002

Attest:

Attesting Officer

JAMES E. ROGAN
*Director of the United States Patent and Trademark Office*